United States Patent Office 3,701,756
Patented Oct. 31, 1972

3,701,756
CATALYTIC PREPARATION OF POLYIMIDES FROM POLYISOCYANATES
Peter S. Carleton, Branford, William J. Farrissey, Jr., North Branford, and James S. Rose, Guilford, Conn., assignors to The Upjohn Company, Kalamazoo, Mich.
No Drawing. Filed Jan. 17, 1969, Ser. No. 792,144
Int. Cl. C08g 20/32
U.S. Cl. 260—78 TF   7 Claims

ABSTRACT OF THE DISCLOSURE

The use of certain catalysts gives markedly improved reaction rates in the formation of imides (mono- and poly-) by reaction of an isocyanate and an intramolecular anhydride. The catalysts are hydroxides of Formula MOH and ureas of formula

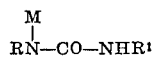

(R and $R^1$ are hydrocarbyl) wherein M in each case is hydrogen or is such that the hydroxide MOH forms a urethane with isocyanate, which urethane will decompose with elimination of carbon dioxide at a temperature not greater than about 150° C. A preferred catalyst is phenylmercuric hydroxide. Tertiary amines can be employed as cocatalysts. The catalytic process can be applied to the preparation of both cellular and non-cellular polyimides by reaction of polyisocyanates and polycarboxylic anhydrides. Optionally a solvent is employed in the reaction.

BACKGROUND OF THE INVENTION

(1) Field of the invention

This invention relates to the preparation of cyclic imides by the interaction of an isocyanate and an intramolecular anhydride, and is more particlarly concerned with the preparation of cyclic imides by interaction of an isocyanate and an intramolecular anhydride in the presence of novel catalyst systems.

(2) Description of the prior art

Methods of preparing imides, particularly polyimides are well-known. Illustratively, polyimides have been prepared in a two-step procedure from a polyamine and a polycarboxylic acid intramolecular anhydride, and in a one-step procedure from a polyisocyanate and a polycarboxylic acid intramolecular anhydride.

In the two-step preparation from a polyamine and a polycarboxylic acid anhydride said components are brought together, generally in the presence of an inert solvent, to form an intermediate polyamide acid. The latter is then cyclised to form the corresponding polyimide, either by heating, for example, at about 200° C. to 250° C. in accordance with the procedure described in British specification 1,035,428, or by reaction with a monobasic acid anhydride such as benzoic anhydride and the like, in the presence of a tertiary amine catalyst such as pyridine, in accordance with the procedure described in Canadian Pat. 736,029.

In the one-step preparation of polyimides from a polyisocyanate and a polycarboxylic acid anhydride it has hitherto been found necessary to bring the components together, either in the molten state or in solution in an appropriate solvent, and to heat the reaction mixture for prolonged periods at a temperature in excess of 100° C. in order to obtain the desired polyimide; see, for example, U.S. Pat. 3,300,420 and Netherlands specification 6609214.

Both of the above types of reaction have obvious disadvantages particularly where it is desired to cast the polyimide in place, as in filling construction walls, refrigerator walls and the like, for insulation purposes. In particular, the need to apply external heat in the formation of the polyimide has seriously limited the number of applications for which polyimides, particularly polyimide foams, can be employed.

We have now found that, by the use of certain novel catalyst systems, it is possible to shorten very substantially the reaction time required in the reaction of an isocyanate and an anhydride to yield the corresponding imide. Further, we have found that by use of certain solvents in combination with said catalysts it is possible to carry out the imide formation at substantially ambient (circa 25° C.) temperatures without the need to apply external heat to the reaction mixture. The advantages which arise from these findings will be obvious to one skilled in the art.

SUMMARY OF THE INVENTION

Our invention, in its broadest aspect, is an improvement in a process for the preparation of a cyclic imide by reaction of an isocyanate and an intramolecular anhydride wherein the improvement comprises carrying out said reaction in the presence of a catalytic amount of a compound selected from the class consisting of compounds of the Formulae MOH (I) and

wherein R and $R^1$ each represent hydrocarbyl from 1 to 12 carbon atoms, inclusive, and M in both instances is a moiety such that the hydroxide MOH corresponding thereto forms a urethane by reaction with said isocyanate reactant, which urethane decomposes with elimination of carbon dioxide at a temperature not greater than about 150° C.

DETAILED DESCRIPTION OF THE INVENTION

Broadly speaking the essentially novel feature of the present invention resides in the employment of the compounds of Formulae I and II above as catalysts in the known reaction of an isocyanate with a carboxylic acid intramolecular anhydride to form the corresponding imide. The procedure employed in carrying out the process of the invention is essentially that employed hitherto in this particular condensation with the notable exception that the catalyst of Formula I or II is always present in the reaction mixture.

In defining the compounds of Formulae I and II which are employed as catalysts in the process of the invention the parameter M has been used and has been characterized as such that the hydroxide MOH in which the moiety M appears forms a urethane, either by reaction with the isocyanate employed in the process of the invention or with any known isocyanate which can be employed in the process of the invention, which urethane is unstable in that it decomposes with elimination of carbon dioxide at a temperature not greater than about 150° C.

In order to clarify the rationale underlying the above definition, and for the purpose merely of seeking to facilitate an understanding of the manner in which the Compounds I and II serve to catalyse the reaction, we offer the following explanation of the possible mechanism of said catalysis. It is to be clearly understood however that the explanation so offered is not in any way to be construed as limiting the scope of this invention which latter is defined solely by the claims appended to this specification.

The probable mechanism of catalysis by the compounds of Formulae I and II can be represented schematically as follows. For the sake of simplicity the mechanism is illustrated in terms of the condensation of phthalic anhydride and phenyl isocyanate but is equally applicable to any particular combination of mono- or poly-anhydride, and mono- or poly-isocyanate.

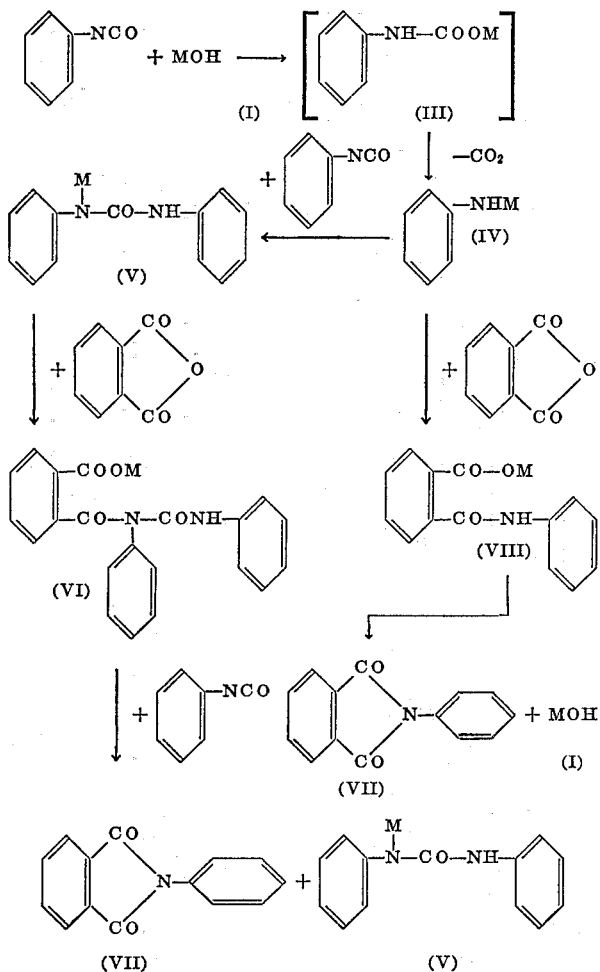

In the postulated mechanism set forth about the first step involves reaction of phenyl isocyanate with the catalyst compound I to form the corresponding urethane (III) as a transitory intermediate. The urethane (III) then decomposes under the conditions of the reaction to yield carbon dioxide and the corresponding aniline derivative (IV). Only certain urethanes will decompose in this manner; many urethanes will merely dissociate under the same conditions to yield the component isocyanate and hydroxide from which the urethane was formed in the first place. Those hydroxides (I) which will behave in the manner shown in the schematic diagram, and will suffer decarboxylation under the conditions of the reaction, are a well-known class. These are the hydroxides which serve as catalysts in the process of the invention. Said class will be discussed and exemplified further below.

The aniline derivative (IV) formed as described above is then capable of condensation with a further molecule of phenyl isocyanate to form the N,N'-diphenylurea derivative (V). It will be readily apparent that the latter compound is an example of the second class of compounds of Formula II which serve as catalyst in the process of the invention. Thus the N,N-diphenylurea derivative represented by Formula V is the compound of Formula II wherein R and $R^1$ each represent phenyl. Hence in accordance with above postulated mechanism the use of a compound of Formula I above in the process of the invention leads to generation of the corresponding compound of Formula II by appropriate reaction with the isocyanate employed in the process of the invention.

We postulate that the aniline derivative (IV) and/or the diphenylurea derivative (V) produced in accordance with the above mechanism are the moieties which catalyse the anhydride-isocyanate reaction. The mechanism by which the Compounds IV and V act in this manner probably involves reaction with the anhydride to form the intermediate amide-acid derivatives (VIII) and (VI) respectively. The latter amide-acid derivatives then decompose with regeneration of the hydroxide (I) in the case of the amide-acid (VIII) and regeneration of the diphenylurea derivative (V) in the case of the amide-acid (VI).

The regenerated moieties (I) and (V) then enter into reaction with a further molecule of anhydride and the cycle is repeated.

It will be seen from the above postulated mechanism that there is apparently a clear inter-relationship between the behavior of the Compounds I and II in the process of the invention. The addition of the Compound I to the reaction mixture appears to result in generation of the corresponding Compound II in the reaction mixture. Alternatively the Compound II can be added as such to the reaction mixture and then functions as the sole catalyst. It is believed unlikely, but it is remotely possible, that the Compound II could generate the corresponding Compound I under the conditions of the reaction.

Illustrative of the Compounds I having the formula MOH which form urethanes decomposing with elimination of carbon dioxide at temperautres not greater than about 150° C., and which therefore qualify as catalysts for use in the process of the invention are:

(i) Water (I; M=H)

(ii) Tertiary aliphatic alcohols wherein the total carbon atom content is from 4 to 12, inclusive (I; M=tert-alkyl) such as tertiary butyl alcohol, tertiary amyl alcohol, 1-methyl-1-ethylbutanol, 1,1-dimethylhexanol, 1-ethyl-1-propylhexanol, 1,1-dimethyloctanol, 1,1-diethylhexanol, and the like;

(iii) Aryl mercuric hydroxides (I; M=ArHg— wherein Ar is aryl) such as phenyl mercuric hydroxide, p-tolyl mercuric hydroxide, o-tolylmercuric hydroxide, m-xylyl mercuric hydroxide, α-naphthyl mercuric hydroxide and the like;

(iv) Triaryl lead hydroxides (I; M=$Ar_3$Pb— wherein Ar is aryl) such as triphenyl lead hydroxide, tri-p-tolyl lead hydroxide, tri-m-xylyl lead hydroxide, tri-α-naphthyl lead hydroxide, and the like;

(v) Triaryl silanols (I; M=$Ar_3$Si— wherein Ar is aryl) such as triphenyl silylhydroxide, tri-p-tolysilylhydroxide, tri-m-xylylsilyl hydroxide, tri-α-naphthylsilyl hydroxide, and the like;

(vi) Triarylmethyl carbinols (I; M=$Ar_3$C— wherein Ar represents aryl) such as triphenylmethyl carbinol, tri-o-tolymethyl carbinol, tri-p-tolymethyl carbinol, tri-α-naphthyl methyl carbinol, and the like.

The term "aryl" employed in the above definitions means the radical obtained by removing a hydrogen atom from a nuclear carbon atom in an aromatic hydrocarbon having from 6 to 12 carbon atoms, inclusive. Examples of aryl are phenyl, o-tolyl, p-tolyl, xylyl, dimethylphenyl naphthyl, diphenylyl, and the like.

The preferred compounds having the Formula I for use in the process of the invention are the aryl mercuric hydroxides, of which phenyl mercuric hydroxide is the most preferred species.

The compounds of Formula II which are employed in the process of the invention are N,N'-dihydrocarbyl ureas which are additionally substituted on one of the nitrogen atoms by the group M which latter has the meaning hereinbefore defined and exemplified. The term "hydrocarbyl" as used throughout the specification and claims means the monovalent radical obtained by removing one hydrogen atom from a parent hydrocarbon preferably one containing from 1 to 18 carbon atoms, inclusive. Illustrative of hydrocarbyl are alkyl groups such as methyl, ethyl, propyl, butyl, pentyl, hexyl, octyl, decyl, dodecyl, hexadecyl, octadecyl, and the like, including isomeric forms thereof; alkenyl groups such as vinyl, allyl, butenyl, pentenyl, hexenyl, octenyl and the like, including isomeric forms thereof; aralkyl such as benzyl, phenethyl, phenylpropyl, benzhydryl, naphthylmethyl, and the like; aryl such as phenyl, tolyl, xylyl, naphthyl, biphenylyl, and the like; cycloalkyl such as cyclobutyl, cyclopentyl, cyclohexyl, cycloheptyl, cyclooctyl, and the like, including isomeric forms thereof; and cycloalkenyl such as cyclopentenyl, cyclohexenyl, cycloheptenyl, and the like, including isomeric forms thereof.

The hydrocarbyl moieties in the compounds of Formula II above can be substituted, in addition to substituents containing exclusively carbon and hydrogen by one or more inert substituents i.e. groups which are not reactive with the isocyanate and/or the anhydride reactants employed in the process of the invention. Examples of such inert substituents are halo, nitro, alkoxy, alkylmercapto and cyano.

Illustrative of the compounds of Formula II above are the N-phenylmercuric, N-triphenylmethyl, N-triphenyllead, and N-triphenylsilyl derivatives of N,N-dimethylurea, N-methyl-N'-ethylurea, N-butyl-N'-isopropylurea, N-hexyl-N'-methylurea, N-methyl-N'-undecylurea, N-dodecyl-N'-ethylurea, N-methyl-N'-phenylurea, N,N'-diphenylurea, N-allyl-N'-phenylurea, N-2-octenyl-N'-benzylurea, N,N'-dibenzylurea, N-1-naphthyl-N'-methylurea, N-benzhydryl-N'-methylurea, N-cyclohexyl-N'-methylurea, and N,N'-dicyclohexylurea.

The compounds having the Formulae I and II are, for the most part, known in the art and can be prepared by methods well-known in the art.

Illustratively the Compound I is widely known in the art and their preparation and properties are described in numerous places. For example, the triarylmethyl carbinols (vi) are described by Fieser and Fieser, Advanced Organic Chemistry, Reinhold Publishing Corp., New York, 1963, pp. 264–314. The arylmercuric hydroxides (iii) and triaryllead hydroxides (iv) are described by G. E. Coates, Organometallic Chemistry, Methuen and Co. Ltd., London, second edition, 1960, pp. 72–87, 116–119, 208. The triarylsilanols (v) can be prepared from the corresponding tetra-arylsilanes by reaction with phosphorus pentachloride followed by hydrolysis of the corresponding triarylchlorosilanes as described, for example, in Chemistry of Carbon Compounds, edited by E. H. Rodd, vol. IIIA, p. 393, Elsevier, New York, 1954.

The compounds of Formula II wherein M=H, alkyl or triarylmethyl are N,N'-di- or tri-substituted ureas well-known in the art; they can be prepared by reaction of the appropriate amine RNH—M and isocyanate $R^1$—NCO; see, for example, Saunders and Frisch, Polyurethanes, Chemistry and Technology, Part I, Chemistry, Interscience Publishers, New York, 1963, p. 65. The compounds of Formula II wherein M=ArHg— can be prepared in a convenient manner by reaction of the corresponding arylmercuric hydroxide (MOH; M=ArHg) with the appropriate carbodiimide R—N=C=N—$R^1$, wherein R and $R^1$ have the significance hereinbefore defined. The reaction is conducted conveniently at room temperature (circa 25° C.) in the presence of an inert organic solvent as hereinbefore defined. The reactants are generally brought together in stoichiometric proportions and the desired product (II; M=ArHg) is isolated by evaporation of the solvent after the reaction is complete.

The compounds of Formula II wherein M=$Ar_3$Pb and $Ar_3$Si, are also prepared conveniently by reaction of the appropriate amine R—NH—M, wherein R and M have the significance hereinbefore defined, with the appropriate isocyanate $R^1$NCO using the procedures described by Saunders et al., supra. The starting amines R—NH—M employed in the above synthesis can be obtained readily by known methods. For example, procedures for the preparation of the silylamines $Ar_3$ SiNHR and their reaction with isocyanates to form the corresponding ureas (II) are described by Klebe et al., J. Am. Chem. Soc., 86, 4400, 1964. The preparation of the appropriate triarylplumbylamines and their reaction with the appropriate isocyanates to give the desired ureas (II; M=$Ar_3$Pb) can be accomplished using the procedures described by Neumann et al., Tetrahedron Letters, 3423 (1966).

In carrying out the process of the invention the procedure adopted is, as stated previously, that which is commonly employed in the art in the reaction of an anhydride and an isocyanate to form an imide, the essential distinguishing character of the process of the invention being the use of a catalytic amount of at least one compound having the Formula I or II. By catalytic amount is meant an amount less than 1 mole per mole of isocyanate employed in the reaction. Advantageously the amount of Compound I or II employed in the process of the invention is within the range of about 0.1 mole to about 0.5 mole per mole of isocyanate. Preferably the amount of Compound I or II employed in the process of the invention is within the range of about 0.01 mole to about 0.1 mole per mole of isocyanate. It will be appreciated, however, that amounts of the Compounds I or II in excess of the proportions set forth can be employed, if desired, although the use of such higher amounts will contribute no additional advantage and, except in the case wherein the Compound I is water, will be subject to serious economic disadvantages.

The process of the invention is accomplished conveniently by bringing together the necessary reactants and the catalyst advantageously, but not necessarily, in the presence of an inert organic solvent. By "inert organic solvent" is meant an organic solvent which is inert under the conditions of the reaction i.e. does not enter into reaction with either of the reactants or the catalyst present in the reaction nor interfere with the desired progress of the reaction in any significant manner. Examples of such inert organic solvents are benzene, toluene, xylene, decalin, tetralin, chlorobenzene, dichlorobenzene, hexane, heptane, octane, dodecane, tetrahydrofuran, pyridine, dioxane, dimethylsulfoxide, dimethylformamide, N,N-dimethylacetamide, hexamethylphosphoramide, and the like.

In the majority of cases it is necessary to heat the mixture of reactants, catalyst and solvent to elevated temperatures, advantageously within the range of about 80° C. to about 150° C., in order to effect the necessary reaction of isocyanate and anhydride. Preferably the reaction temperature employed is within the range of about 120° C. to about 130° C. However, in the case of certain catalyst systems, illustratively, phenylmercuric hydroxide in hexamethylphosphoramide, it has been found, surprisingly, that it is unnecessary to supply external heat to the reaction mixture. In these instances the reaction takes place spontaneously when the reactants and catalyst are brought together, in the presence of the inert organic solvent (if one is used), at a temperature of the order of about 25° C. i.e. at the normal ambient temperature prevailing in the area in which the reaction is conducted.

The proportion in which the isocyanate and anhydride are employed is generally stoichiometric i.e. there is present substantially 1 equivalent of isocyanate for each anhydride moiety present in the mono or polycarboxylic intramolecular anhydride employed in the reaction.

The progress of the reaction is generally readily followed by standard analytical techniques, for example, by observing the appearance of absorptions highly characteristic of cyclic imides using infrared spectroscopic analysis. When the reaction is observed in this manner to be complete the desired imide can be isolated from the reaction mixture by routine procedures, for example, by evaporation of the inert organic solvent followed by separation of the imide from the residual catalyst by solvent extraction, recrystallization (in the case of solid imides) or distillation (in the case of liquid imides).

As previously mentioned the process of the invention can be employed in the preparation of mono-imides by reaction of a monoisocyanate with a monoanhydride and in the preparation of polyimides by the reaction of polyisocyanates with polyanhydrides. In the case of the polyimides the reaction can be conducted in such a manner as to give either cellular or non-cellular products. The reaction of a polyisocyanate and a polyanhydride gives rise to the elimination of carbon dioxide. The carbon dioxide can, if desired, be removed from the reaction mixture as it is produced and, in the absence of any other added blowing agent, the reaction product will be non-cellular.

In preparing the non-cellular products in accordance with the invention the amount of inert organic solvent employed is generally much greater than when a cellular product is prepared. The non-cellular polyimide generally separates directly from the reaction mixture as a solid precipitate. Such precipitate is generally in finely divided form and can be isolated readily, freed from solvent, and used for molding of high temperature resistant articles. The molding is carried out conveniently using techniques conventionally employed in molding powdered metals, such as by sintering or hot pressing; see, for example, "Encyclopedia of Chemical Technology" edited by Kirk and Othmer, Interscience Encyclopedia Inc., vol. 11, pp. 54–5, New York (1953).

Alternatively, the above reaction mixture can be cast, prior to the point at which precipitation occurs, on to a suitable substrate such as an open tray. Removal of the solvent from the cast product, e.g. by evaporation under reduced pressure, leaves the desired polyimide in solid form. The resulting polymer can, if desired, be machined or otherwise fabricated to form articles having high thermal stability. Alternatively, the cast polymer can be chopped or ground to a finely powdered condition for use in molding articles having high thermal stability using, for example, the procedures described above.

In preparing cellular products in accordance with the process of the invention, the polyisocyanate, the polycarboxylic derivative and the catalyst [(I) or (II)] together with a minor amount of an inert organic solvent are brought together under foam producing conditions using additional blowing agents, if desired, and like adjuvants commonly employed in the related art of preparing polyurethane foams. A prepolymer technique can be employed, if desired, e.g. by first reacting the polyisocyanate with a portion of the polycarboxylic derivative and subjecting the isocyanate-terminated prepolymer to foaming. Preferably a one shot procedure is employed i.e. all the reactants are brought together into the foam reaction mix. The order or manner in which the reactants are mixed in the one shot procedure is not critical. However, it is preferred that the polycarboxylic derivative be preblended with the polyisocyanate and that the blend so obtained be admixed with the catalyst, inert organic solvent and other adjuvants to form the foam reaction mixture. The mixing of the various reaction components can be carried out by hand when operating on the small scale but is advantageously carried out using the various mixing and dispensing machines conventionally employed in the manufacture of polymer foams; see, for example, Ferrigno, "Rigid Plastic Foams" Reinhold Publishing Corp., New York pp. 51–61 (1963).

When preparing the cellular polyimides in accordance with the process of the invention it is, of course, preferable to employ those catalysts of Formula I or II which, as set forth above, will effect reaction of the polyisocyanate and polyanhydride without the necessity to apply external heat to the reaction mixture. Such a mode of operation is especially advantageous where the foam is to be poured-in-place in cavity walls and the like which would render difficult, or impossible, the application of external heat to induce reaction.

It is well-known in the art that the condensation reaction of polyisocyanates with polycarboxylic derivatives results in elimination of carbon dioxide; see, Saunders et al., ibid, p. 186. This evolved carbon dioxide can behave as an in situ foaming agent resulting in low density, high temperature resistant cellular products. If lower density products are desired other extraneously added foaming agents may be employed in the preparation of cellular products in accordance with the novel process of the invention.

Illustrative of said foaming agents are water (which generates carbon dioxide by reaction with isocyanate) and volatile solvents such as the lower molecular weight aliphatic hydrocarbons, namely those having boiling points of from about $-40°$ to about $200°$ C., preferably from about $-20°$ to about $115°$ C., for example, difluorochloromethane, trichloromonofluoromethane, dichlorodifluoromethane, chlorotrifluoromethane, 1,1-dichloro-1-fluoroethane, 1-chloro-1,1-difluoro-2,2-dichloroethane, and 1,1, 1 - tribromo - 2 - chloro - 2 - fluorobutane, and the like. If desired, a mixture of water and one or more of said volatile solvents can be used as a foaming agent. It is to be noted that water can serve the double role of catalyst and blowing agent in this aspect of the invention.

In preparing polymers according to the process of the invention, it is optional to employ co-catalysts. These co-catalysts can be any of the catalysts conventionally employed in the catalysis of the reaction of an isocyanate with a reactive hydrogen containing compound; see, Saunders et al., ibid, Part I, pp. 228–232, see also Britain et al., "J. Applied Polymer Science," 4, 207–211, 1960.

Illustrative of catalysts which can be employed in the formation of cellular foams in accordance with the invention are organic and inorganic acid salts and organometallic derivatives of: bismuth, lead, tin, iron, antimony, zinc, cadmium, mercury, uranium, cobalt, thorium, aluminum, nickel, cerium, molybdenum, vanadium, copper, manganese, and zirconium, as well as phosphines and peroxides. The preferred co-catalysts for use in the process and compositions of the invention are the tertiary organic amines of which the following are representative: triethylamine, triethylenediamine and derivatives thereof, N,N,N',N'-tetramethylethylenediamine, N,N,N',N'-tetraethylethylene diamine, N-methylmorpholine, N-ethylmorpholine, N,N, N',N'- tetramethylguanidine, N,N,N',N'- tetramethyl-1,3-butanediamine, N,N-dimethylethanolamine, N,N-diethylethanolamine, and the like, or mixtures of two or more such amines.

Other optional additives such as dispersing agents, cell stabilizers, surfactants, flame retardants, and the like which are commonly employed in the fabrication of polymer foams, can be employed in the process of the invention. Thus a finer cell structure may be obtained if water-soluble organosilicone polymers are used as surfactants in the reaction mix. Organosilicone polymers obtained by condensing a polyalkoxy polysilane with the monoether of a polyalkylene glycol in the presence of an acid catalyst are representative of those surfactants which can be used for this purpose. Other surfactants such as ethylene oxide modified sorbitan monopalmitate or ethylene oxide modified polypropylene-ether glycol may be used, if desired, to obtain better dispersion of the components of the foam mixture.

Additives such as dyes, pigments, soaps and metallic powders and other inert fillers may be added to the foam mixture to obtain special foam properties in accordance with practices well-known in the art.

The isocyanates which can be employed in the process of the invention include any of the known mono- and polyisocyanates such as those disclosed by Siefken, Ann. 562, 122–135 (1949). Illustrative of the isocyanates which are employed in the process of the invention are organic monoisocyanates such as phenyl isocyanate, p-tolylisocyanate, o-tolyl isocyanate, m-xylyl isocyanate, α-naphthyl isocyanate, octadecyl isocyanate, benzyl isocyanate, allyl isocyanate, cyclohexyl isocyanate, p-nitrophenyl isocyanate, o-chlorophenyl isocyanate, m-chlorophenyl isocyanate, p-fluorophenyl isocyanate, 4,4,4-trichloro-2-bromobutyl isocyanate, and the like, and polyisocyanates such as 2,4-tolylene diisocyanate, 2,6-tolylene diisocyanate, 4,4'-methylenebis(phenyl isocyanate), dianisidine diisocyanate, tolidine diisocyanate, hexamethylene diisocyanate, 4,4'-methylenebis(cyclohexyl isocyanate), m-xylene diisocyanate, 1,5-naphthalene diisocyanate, 1,4-diethylbenzene-β, β'-diisocyanate and other di- and higher polyisocyanates such as those listed in the tables of Siefken, supra. Mixtures of two or more of the above isocyanates can be used, such as mixtures of the 2,4- and 2,6-isomers of tolylene diisocyanate, mixtures of the 2,4'- and 4,4'-isomers of methylenebis(phenyl isocyanate) and the like. In addition to the 4,4'-methylenebis(phenyl isocyanate) or mixtures of the 2,4'-isomer and 4,4'-isomer thereof which are employed as the isocyanate component, there can also be used modified forms of these isocyanates. For example there can be used 4,4'-methylenebis(phenyl isocyanate), or an admixture thereof with a minor amount of the 2,4'-isomer, which has been treated to convert a minor proportion, generally less than 15% by weight of the starting material, to an artefact of said starting material. For example, the polyisocyanate component (I) can be methylenebis(phenyl isocyanate) which has been converted to a stable liquid at temperatures of about 15° C. and higher using, for example, the processes described in U.S. Pats. 3,384,653, 3,394,164 and 3,394,165.

Illustrative of another modified form of 4,4'-methylenebis(phenyl isocyanate) which can form the polyisocyanate component (I) is the product obtained by treating the former compound, or mixtures thereof with small portions of the 2,4'-isomer, with a minor portion of a carbodiimide such as diphenylcarbodiimide in accordance, for example, with the procedure described in British Pat. 918,454. In accordance with said process, a minor proportion of the methylene-bis(phenyl isocyanate) is converted to the corresponding isocyanato-carbodiimide and there is obtained a mixture of a major proportion of unchanged starting material and a minor proportion of said isocyanato-substituted carbodiimide.

In addition to the various modified forms of methylenebis(phenyl isocyanate) exemplified above there can also be employed as the polyisocyanate component a mixture of methylenebis(phenyl isocyanate) with polymethylene polyphenyl isocyanates of higher functionality. Such mixtures are generally those obtained by phosgenation of corresponding mixtures of methylene bridged polyphenyl polyamines. The latter, in turn, are obtained by interaction of formaldehyde, hydrochloric acid and primary aromatic amines, for example, aniline, o-chloroaniline, o-toluidine and the like. Such polyamines and polyisocyanates prepared therefrom are known in the art, see, for example, U.S. 2,683,730; 2,950,263; 3,012,008, and 3,097,191; Canadian Pat. 665,495; and German Pat. 1,131,877. Preferred polymethylene polyphenyl polyisocyanates are those containing from about 35% to about 60% by weight of methylenebis(phenyl isocyanate). The polymethylene polyphenyl isocyanate available commercially under the trademark PAPI® is typical of this type of polyisocyanate.

The carboxylic acid intramolecular anhydrides which are employed in the process of the invention can be any mono- or poly intramolecular anhydride. Illustrative of the mono intramolecular anhydrides are phthalic anhydride, succinic anhydride, adipic anhydride, glutaric anhydride, citraconic anhydride, maleic anhydride, itaconic anhydride, fumaric anhydride, naphthalene-1,2-dicarboxylic acid anhydride, naphthalene-1,8-dicarboxylic acid anhydride, chlorendic anhydride, 1,2,3,6-tetrahydrophthalic acid anhydride, and the like. The polycarboxylic acids which are employed in the process of the invention contain at least two carboxylic moieties selected from the class consisting of free carboxy groups and anhydride groups. Said polycarboxylic derivatives are inclusive of aromatic, aliphatic, cycloaliphatic or heterocyclic polycarboxylic acids as well as the intramolecular and/or intermolecular anhydrides thereof, provided that, in the case of those anhydrides which contain a single anhydride group there is also present in the molecule at least one free carboxy group. As will be appreciated by one skilled in the art only those polycarboxylic acids which contain carboxy groups attached either to two adjacent carbon atoms or to two carbon atoms which are separated from each other by a single carbon or hetero-atom are capable of forming intra- as opposed to inter- molecular acid anhydrides.

Any of the aforesaid polycarboxylic acids or anhydrides can be employed as the polycarboxylic derivative in the process of the invention. As will be apparent to the skilled chemist the nature of the recurring units in the resulting polyimides will vary according to the structure of the starting polycarboxylic derivative.

When the polycarboxylic acid derivative is a dicarboxylic acid which is incapable of forming an intramolecular anhydride, the product formed in accordance with the process of the invention is a polyamide e.g. the product from said dicarboxylic acid and a diisocyanate would contain the recurring unit:

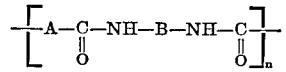

wherein A is the hydrocarbon residue of the dicarboxylic acid starting material and B is the hydrocarbon residue of the diisocyanate. On the other hand, when the polycarboxylic derivative is an intramolecular or intermolecular anhydride which contains two or more anhydride moieties or contains one anhydride moiety and free carboxylic acid groups capable of intramolecular or intermolecular anhydride formation, the product of reaction in accordance with the process of the invention is a polyamide e.g. the product of reaction of a diisocyanate and a polycarboxylic acid derivative containing two intramolecular anhydride groups would contain the recurring unit:

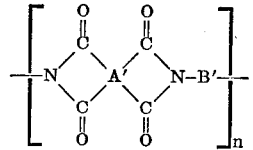

wherein A' is the hydrocarbon residue of the dianhydride and B' is the hydrocarbon residue of the diisocyanate.

Similarly where the polycarboxylic acid derivative contains one or more anhydride groups in addition to a free carboxylic acid group or groups, the polymer resulting from the process of the invention will be a hybrid containing both amide and imide linkages.

All of the above types of polymers can be prepared in accordance with the novel process hereinabove described and all fall within the scope of this invention. Thus, by appropriate choice of the polycarboxylic acid derivative it is possible to prepare any of a wide variety of polymers using the single step process of the invention.

Examples of polycarboxylic derivatives which can be employed as the free carboxylic acids or as intermolecular anhydrides formed from the same or different acids are: isophthalic acid, terephthalic acid, trimesic acid and phthalic acid. Examples of polycarboxylic derivatives which can be employed as the free carboxylic acids or intramolecular anhydrides thereof, are:

trimellitic acid and the anhydride thereof,
pyromellitic acid and the dianhydride thereof,
mellophanic acid and the anhydride thereof,
benzene-1,2,3,4-tetracarboxylic acid and the dianhydride thereof,
benzene-1,2,3-tricarboxylic acid and the anhydride thereof,
diphenyl-3,3',4,4'-tetracarboxylic acid and the dianhydride thereof,
diphenyl-2,2',3,3'-tetracarboxylic acid and the dianhydride thereof,
naphthalene-2,3,6,7-tetracarboxylic acid and the dianhydride thereof,
naphthalene-1,2,4,5-tetracarboxylic acid and the dianhydride thereof,
naphthalene-1,4,5,8-tetracarboxylic acid and the dianhydride thereof,
decahydronaphthalene-1,4,5,8-tetracarboxylic acid and the dianhydride thereof,
4,8-dimethyl-1,2,3,5,6,7 - hexahydronaphthalene - 1,2,5,6-tetracarboxylic acid and the dianhydride thereof,
2,6-dichloronaphthalene-1,4,5,8-tetracarboxylic acid and the dianhydride thereof,
2,7-dichloronaphthalene-1,4,5,8-tetracarboxylic acid and the dianhydride thereof,
2,3,6,7-tetrachloronaphthalene-1,4,5,8-tetracarboxylic acid and the dianhydride thereof,
phenanthrene-1,3,9,10-tetracarboxylic acid and the dianhydride thereof,
perylene-3,4,9,10-tetracarboxylic acid and the dianhydride thereof,
bis(2,3-dicarboxyphenyl)methane and the dianhydride thereof,
bis(3,4-dicarboxyphenyl)methane and the dianhydride thereof,
1,1-bis(2,3-dicarboxyphenyl)ethane and the dianhydride thereof,
1,1-bis(3,4-dicarboxyphenyl)ethane and the dianhydride thereof,
2,2-bis(2,3-dicarboxyphenyl)propane and the dianhydride thereof,
2,3-bis(3,4-dicarboxyphenyl)propane and the dianhydride thereof,
bis(3,4-dicarboxyphenyl)sulfone and the dianhydride thereof,
bis(3,4-dicarboxyphenyl)ether and the dianhydride thereof,
ethylene tetracarboxylic acid and the dianhydride thereof,
butane-1,2,3,4-tetracarboxylic acid and the dianhydride thereof,
cyclopentane-1,2,3,4-tetracarboxylic acid and the dianhydride thereof,
pyrrolidine-2,3,4,5-tetracarboxylic acid and the dianhydride thereof,
pyrazine-2,3,5,6-tetracarboxylic acid and the dianhydride thereof,
mellitic acid and the trianhydride thereof,
thiophen-2,3,4,5-tetracarboxylic acid and the dianhydride thereof, and
benzophenone-3,3',4,4'-tetracarboxylic acid and the dianhydride thereof.

Other anhydrides which may be employed in the practice of the invention are; the intermolecular anhydride of trimellitic acid 1,2-anhydride (see, for example U.S. 3,155,687), the bisanhydrides disclosed in U.S. 3,277,117 [e.g. 4,4'-ethylene glycol bis-anhydro trimellitate and 4,4'-(2-acetyl-1,3-glycerol) bis-anhydro trimellitate] and the di-adducts of maleic acid or anhydride with styrene.

While any of the polycarboxylic acids and intramolecular or intermolecular anhydrides thereof defined and exemplified above can be employed in the preparation of the polymers of the invention a preferred group of compounds for this purpose are intramolecular anhydrides which are derived from polycarboxylic acids having at least 3 carboxyl groups of which at least two carboxyl groups are attached directly to an aromatic nucleus in ortho-position with respect to each other. A particularly preferred group of polycarboxylic acid intramolecular anhydrides are those selected from the class consisting of anhydrides having the following formulae:

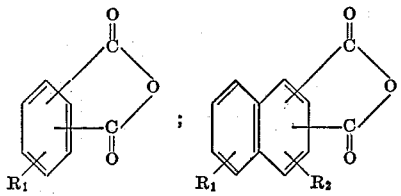

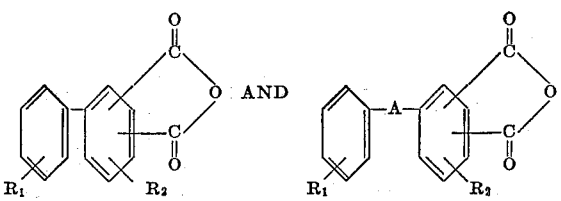

wherein at least one of $R_1$ and $R_2$ represents a group selected from the class consisting of carboxyl and the group

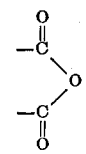

wherein the carbon atoms of the latter are each attached to adjacent carbon atoms in an aromatic ring, and wherein $R_1$ and $R_2$ additionally represent from 0 to 3 substituents selected from the group consisting of halogen and lower-alkyl and A is a bridging group selected from the class consisting of lower-alkylene, carbonyl, sulfonyl and oxygen.

The term "lower-alkyl" means alkyl containing from 1 to 6 carbon atoms, inclusive, such as methyl, ethyl, propyl, butyl, pentyl, hexyl, and isomeric forms thereof. The term "halogen" means fluorine, chlorine, bromine and iodine. The term "lower-alkylene" means alkylene containing from 1 to 6 carbon atoms, inclusive, such as methylene, ethylene, 1,3-propylene, 1,4-butylene, 2,3-butylene, 1,6-hexylene and the like.

The imides produced in accordance with the process of the invention are, for the most part, known in the art and are useful in ways which are familiar to the art. For example, many of the monoimides, particularly those derived from chlorendic acid anhydride, are known to be useful as insecticides, fungicides, and herbicides. Illustratively, N-arylphthalimides such as N-phenylphthalimide, exhibit growth-regulatory effects and can be used for prevention of fruit drop, rooting of cuttings, formation of parthenogenic fruit, and the like; Canadian Pat. 519,684. N-arylphthalimides such as N-phenylphthalimide are also useful as stabilizers for polysulfone resins; U.S. Pat. 2,643,237.

The polyimides produced in accordance with the invention can be employed for a variety of purposes. Illustratively, the non-cellular products may be shaped, for example, by machining from billets, by punching or by making use of powdered metal techniques, into articles such as grinding wheels, friction devices such as brakes and clutches, or they may be used as coating compositions. Said coating compositions may be used as impregnating resins or applied to various substrates, such as metals, wires, woven fabrics or even to other polymeric materials. The cellular products of the invention can be employed for all the purposes for which the currently produced commercial cellular products are conventionally employed. For example, the cellular products of the invention can be employed as thermal barriers in the construction of fire walls in the building of industrial and institutional structures (e.g. schools, hospitals, etc.) and as insulating materials for high temperature pipe lines and ovens, in supersonic aircraft and also as missile components. As previously pointed out, the novel process of the invention enables cellular products of the above type to be poured-in-place much more readily and economically than previous methods described for the preparation of polyimide and like foams. Thus the process of the invention does not require the application of external heat in order to effect the polymer formation nor does it require the heating of molds, cavity walls, and the like, to high temperatures.

The advantages which flow from the use of the process of the invention will be obvious to one skilled in the art. The use of the novel catalyst systems enables the condensation of anhydride and isocyanate to be effected in a greatly reduced period of time and, indeed, in some cases enables the reaction to be carried out in solvent systems which hitherto led to no useful result in the attempted condensation. Further, in certain instances, it has been found that use of the novel catalyst system can be used to effect the condensation at substantially room temperature whereas elevated temperatures have been necessary hitherto. The advantages, particularly in the preparation of pour-in-place polyimide foam formulations, of being able to conduct the condensation at room temperature are clearly apparent.

The following examples describe the manner and process of making and using the invention and set forth the best mode contemplated by the inventors of carrying out the invention but are not to be construed as limiting.

EXAMPLE 1

Three parallel reactions were carried out. Each reaction mixture contained phthalic anhydride (5.92 g:0.04 mole), phenyl isocyanate (4.35 ml.:0.04 mole), and 40 ml. of benzene (previously dried by azeotropic distillation). In the one reaction (Run 1) no catalyst was present. In the second reaction mixture (Run 2) phenylmercuric hydroxide (1.18 g:0.004 mole) was present as catalyst. In the third reaction mixture (Run 3) a mixture of phenylmercuric hydroxide (1.18 g.:0.004 mole) and triethylene diamine (0.45 g.:0.004 mole) was present as catalyst.

Run 1 reaction mixture was heated under reflux for 25 hr. at the end of which time no reaction was observed to have taken place (infrared spectroscopic analysis indicated no imide formation). In Runs 2 and 3 imide formation was found by infrared analysis to be complete at the end of 18 hr. at reflux. At the end of this time the reaction mixtures were cooled and the solid N-phenylphthalimide which separated was isolated by filtration, a second crop being obtained by concentration of the filtrate. The yield of imide isolated from Run 2 was 94% theoretical and that from Run 3 was 100% theoretical.

EXAMPLE 2

To a solution of phthalic anhydride (5.95 g.:0.04 mole) in 40 ml. of chloroform was added phenylmercuric hydroxide (1.18 g.:0.004 mole) and the mixture allowed to stand until nearly all solid had passed into solution. To the resulting mixture was added phenyl isocyanate (4.35 ml.:0.04 mole) followed by triethylenediamine (0.45 g.:0.004 mole). The yellow solution so obtained evolved carbon dioxide slowly at room temperature but, after heating to reflux, the evolution of gas became vigorous. After heating under reflux for 2 hr. the infrared spectrum of an aliquot indicated that imide formation was substantially complete. The mixture so obtained was cooled to room temperature (circa 25° C.) and allowed to stand at this temperature for 16 hr. At the end of this time the solid N-phenylphthalimide (5.3 g.; M.P. 202 to 204° C.) which had separated was isolated by filtration. The filtrate was heated briefly with aqueous sodium bicarbonate solution and concentrated to yield a further crop (2.77 g.) of N-phenylphthalimide. The total yield of N-phenylphthalimide represented 90.3% of the theoretical based on anhydride.

EXAMPLE 3

A mixture of chlorendic anhydride (1.86 g.:0.005 mole), phenyl mercuric hydroxide (0.147 g.:0.0005 mole), and triethylene diamine (0.056 g.:0.0005 mole) was dissolved in hexamethylphosphoramide (5 ml.). To the resulting tan colored solution was added phenyl isocyanate (0.59 g.:0.005 mole) and the mixture became violet in color. Some evolution of gas occurred on standing for a short period at circa 25° C. The reaction mixture was allowed to stand for 48 hr. at this temperature and was then poured into sodium chloride solution. The mixture was extracted with chloroform and the chloroform extract was washed with water before being dried over anhydrous sodium sulfate and evaporated to dryness. The residue was recrystallised from absolute ethanol to yield a total (including second crop) of 1.31 g. (60% theoretical) of N-phenyl chlorendimide.

EXAMPLE 4

A mixture of phthalic anhydride (0.74 g.:0.005 mole), phenyl isocyanate (0.54 ml.:0.005 mole), phenylmercuric hydroxide (0.147 g.:0.0005 mole) and triethylenediamine (0.056 g.:0.0005 mole) was mixed with 5 ml. of hexamethyl phosphoramide An exothermic reaction occurred immediately and solid N-phenylphthalimide began to separate from solution after allowing the mixture to stand for approximately 15 minutes at room temperature (circa 25° C.). After allowing the mixture to stand at the same temperature for approximately 16 hrs. the infrared spectrum of an aliquot indicated substantially complete formation of N-phenylphthalimide.

EXAMPLE 5

The process described in Example 4 was repeated with the sole exception that the triethylenediamine employed as catalyst was omitted. The initial exotherm was much lower. Evolution of gas began some 30 minutes after beginning of the reaction and deposition of solid began 3 hr. after bringing the reactants together. Imide formation was found by infrared spectroscopic analysis to be substantially complete at the end of 16 hrs. at circa 25° C.

EXAMPLE 6

A mixture of phenyl isocyanate (4.35 ml.:0.04 mole), phthalic anhydride (6.0 g.:0.04 mole) and anhydrous pyridine (40 ml.) was heated under reflux with exclusion of atmospheric moisture. After reflux for 143 hrs. infrared spectroscopic examination of an aliquot showed imide formation. The above experiment was repeated with the addition of various amounts of water to the initial reaction mixture. The formation of imide in each run was followed by infrared spectroscopic analysis of an aliquot and the reaction was stopped in each case when the spectroscopic examination showed that imide formation was substantially complete.

The following table shows the amount of water added (expressed as equivalents of water per equivalent of phenyl isocyanate) in each run and the time taken for imide formation to reach completion.

| Run | Amount of added water (equivalents) | Time for imide formation to reach completion, hours |
|---|---|---|
| A | 0.028 | ca. 141 |
| B | 0.063 | ca. 42 |
| C | 0.125 | ca. 18 |
| D | 0.250 | ca. 5 |
| E | 0.50 | ca. 2 |

EXAMPLE 7

N-phenylmercuri-N,N'-diphenyl urea was prepared as follows. To a solution of 0.775 g. (0.004 mole) of diphenylcarbodiimide (Campbell et al. J. Am. Chem Soc., 84, 3673, 1962) in 40 ml. of benzene, maintained under anhydrous conditions, there was added with stirring 1.175 g. (0.004 mole) of phenylmercuric hydroxide. The resulting mixture was stirred at room temperature (circa 25° C.) for 16 hrs. after the addition was complete. Thereafter the reaction mixture was filtered to remove a small amount of white solid and the filtrate so obtained (a solution of N-phenylmercuri-N,N'-diphenylurea in benzene) was employed without further treatment in the following reaction.

To the above benzene solution was added 5.92 g. (0.04 mole) of phthalic anhydride and 4.35 ml. (0.04 mole) of phenyl isocyanate and the mixture was heated under reflux. After 3 hrs. heating the formation of imide was detected by infrared spectroscopic analysis of an aliquot. Imide formation was found by the same analytical procedure to be substantially complete after 17 hrs. refluxing.

EXAMPLE 8

A polyimide was prepared as follows:

To a mixture of 5 g. (0.02 mole) of 4,4'-methylenebis (phenyl isocyanate) and 8.68 g. (0.02 mole) of benzophenone-3,3',4,4'-tetracarboxylic acid dianhydride in 40 ml. of pyridine was added 1.2 g. (0.002 mole) of phenylmercuric hydroxide. The resulting mixture was heated at 95° C. for 6 hr. at the end of which time the reaction was judged complete by infrared absorption spectral analysis. Considerable gas evolution occurred during the heating and a solid separated from solution. At the end of the above period of heating the reaction mixture was cooled and diluted with acetone. The yellow solid which had separated was isolated by filtration, washed with acetone and dried to obtain 9.8 g. of a light yellow powdery polyimide showing maxima in the infrared spectra at 5.6μ, 5.8μ and 7.25μ, these bands being characteristic of imides.

The above procedure was repeated using exactly the same reaction components and reaction temperature with sole exception that the phenylmercuric hydroxide catalyst was omitted. After heating the reaction mixture for 18 hr. it was found by infrared spectroscopic analysis that approximately 50 percent of the starting isocyanate and anhydride were still present in the reaction mixture.

EXAMPLE 9

Using the procedure described in Example 1, Run 2, but replacing phenylmercuric hydroxide by tert.-butyl alcohol, there was obtained N-phenylphthalimide in comparable yield.

Similarly, using the procedure described in Example 1, Run 2, but replacing phenylmercuric hydroxide by p-tolylmercuric hydroxide, m-xylylmercuric hydroxide, α-naphthylmercuric hydroxide, triphenyllead hydroxide, triphenylsilyl hydroxide, tri-α-naphthylsilyl hydroxide, triphenylmethcarbinol, tri-o-tolylmethylcarbinol, tri-p-tolylmethylcarbinol, N-triphenyllead-N,N'-diphenylurea, N-triphenylsilyl-N,N'-diphenylurea, N-triphenylmethyl - N, N'-diphenylurea, N-phenylmercuri-N,N'-dibenzylurea, N-phenylmercuri-N-phenyl-N'-methylurea, N - phenylmercuri-N-allyl-N'-methylurea, N-phenylmercuri-N - phenyl-N'-cyclohexylurea, and N-phenylmercuri-N - butyl - N'-cyclohexenylurea, there was obtained N-phenylphthalimide in comparable yield.

What is claimed is:

1. In a process for the preparation of a solid polyimide by reacting an organic polyisocyanate and a member selected from the group consisting of (i) polycarboxylic anhydrides which contain two intramolecular anhydride groups, (ii) polycarboxylic anhydrides which contain a free carboxylic acid group and an intramolecular anhydride group and (iii) the polycarboxylic acids corresponding to the anhydrides of (i) and (ii), the improvement which comprises carrying out said reaction at a temperature of about 25° C. to about 150° C. in the presence of a catalytic amount of a compound selected from the class consisting of compounds of the formulate M—OH,

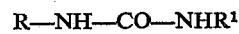

and

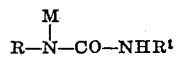

wherein R and $R^1$ each represent hydrocarbyl from 1 to 12 carbon atoms, inclusive, and M is selected from the group consisting of tertiary-alkyl of from 4 to 12 carbon atoms, inclusive, Ar-Hg, $Ar_3Pb$, $Ar_3Si$, and $Ar_3C$ wherein Ar in each instance represents aryl from 6 to 12 carbon atoms, inclusive.

2. The improved process according to claim 1 wherein the compound employed as catalyst is phenyl mercuric hydroxide.

3. The improved process according to claim 1 wherein the compound employed as catalyst is a compound having the formula:

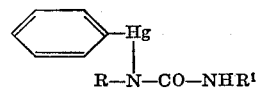

wherein R and $R^1$ each represent hydrocarbyl from 1 to 12 carbon atoms, inclusive.

4. The improved process according to claim 1 wherein a tertiary amine is employed as cocatalyst.

5. In a process for the preparation of a solid polyimide by reacting an organic polyisocyanate and a member selected from the group consisting of (i) polycarboxylic anhydrides which contain two intramolecular anhydride groups (ii) polycarboxylic anhydrides which contain a free carboxylic acid group and an intramolecular anhydride group and (iii) the polycarboxylic acids corresponding to the anhydrides of (i) and (ii), the improvement which comprises carrying out the reaction at ambient temperature in the presence of hexamethyl phosphoramide as the reaction solvent and a catalytic amount of phenylmercuric hydroxide.

6. The improved process of claim 5 wherein a tertiary amine is employed as cocatalyst.

7. The improved process of claim 5 wherein said tertiary amine cocatalyst is triethylenediamine.

References Cited
UNITED STATES PATENTS

| | | | |
|---|---|---|---|
| 3,300,420 | 1/1967 | Frey | 260—78 |
| 3,314,923 | 4/1967 | Muller et al. | 260—78 |
| 3,489,696 | 1/1970 | Miller | 260—78 |
| 3,493,540 | 2/1970 | Muller et al. | 260—78 |

HAROLD D. ANDERSON, Primary Examiner

U.S. Cl. X.R.

260—2.5 N, 47 CB, 63 N, 78 R, 78 UA, 326 R, 553 A